UNITED STATES PATENT OFFICE.

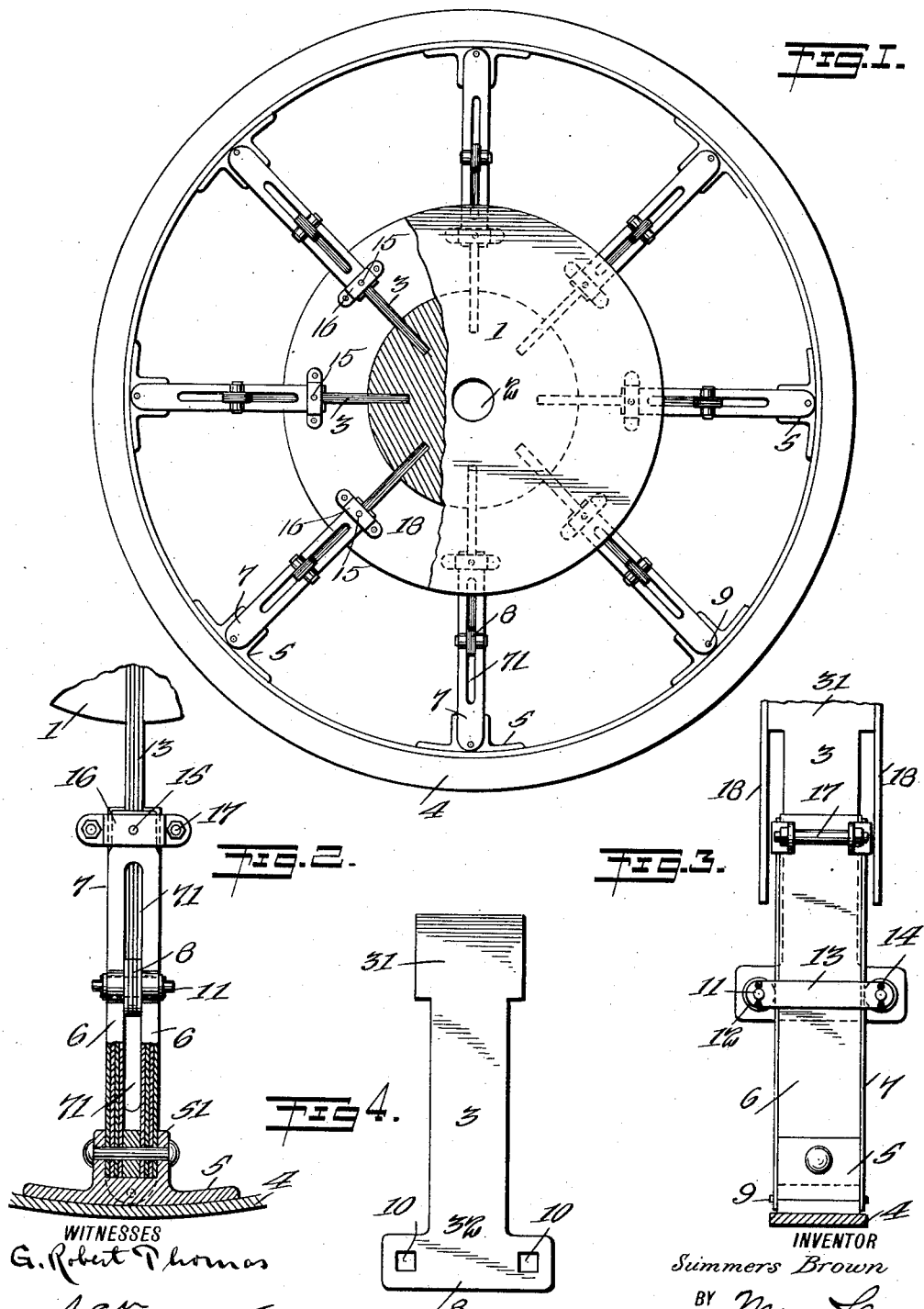

SUMMERS BROWN, OF LONDON, ENGLAND.

WHEEL.

1,063,771.

Specification of Letters Patent.

Patented June 3, 1913.

Application filed January 12, 1912. Serial No. 670,781.

*To all whom it may concern:*

Be it known that I, SUMMERS BROWN, a subject of the King of Great Britain, and a resident of London, England, have invented a new and Improved Wheel, of which the following is a full, clear, and exact description.

My invention relates to a new and improved resilient spring wheel.

An object of my invention is to provide a wheel for use on vehicles, whereby I may attain all the advantages of a pneumatic or cushion type wheel without the disadvantages thereof.

A further object of my invention is to provide a wheel for absorbing shocks from uneven roads, or obstructions on the same.

A still further object of my invention is to provide a wheel comprising relatively few parts which might get out of order, to provide means whereby access may readily be gained to the different parts, and in which the different parts may readily be replaced.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification in which similar characters of reference indicate corresponding parts in all the figures, and in which—

Figure 1 is a side elevation of a preferred embodiment of my invention, part of a guard plate being broken away to show the internal mechanism; Fig. 2 is an enlarged side elevation of one of the spokes; Fig. 3 is an end elevation of the spoke shown in Fig. 2; and Fig. 4 is an enlarged detailed face view of one of the spring hub spokes.

Described more in detail, I have shown a hub 1, of any suitable construction, having an axle bore 2, which hub has a series of radially-disposed hub springs 3 preferably of a laminated structure, suitably fastened to said hub and extending therefrom for some material distance. These hub springs, as shown more particularly in Fig. 4, are of a general solid I construction, one broad head 31 of which is held to the hub, and the other broad head 32 of which has a pair of apertures 10 therethrough within transversely-disposed extensions 8. Concentrically disposed relative to the hub 1 and spaced some material distance from the head 32 of the hub springs 3, is a rim 4, of any suitable construction, which rim is disposed in the plane of the hub 1.

Disposed about the inner face of the rim 4, is a series of spaced-apart shoes 5, fastened to the rim by any suitable means, and one shoe disposed in diametrical alinement with each of said hub springs 3. Each of the shoes has an inwardly-facing slot 51 disposed parallel with and on opposite sides of the plane containing the hub spring 3. Disposed in the slots 51, is a pair of spaced-apart rim springs 6 each preferably comprising a laminated structure slightly wider than the hub spring 3 and disposed on opposite sides of said hub spring.

By the above construction, it will be seen that any movement of the hub relative to the rim will cause the hub plate to telescope frictionally between the rim springs 6. A relatively thin side plate 7, having a longitudinal slot 71 therein, is disposed on opposite transverse sides of the rim springs 6, and each of these plates 7 has a pivotal connection 9 with the opposite transverse sides of the shoe 5. Slidable longitudinally in the slot 71 of each of the plates 7, is the extension 8 of the hub spring 3.

Disposed through each of the apertures 10 is a spindle 11, upon which two rollers 12 are placed and are held in position by means of cotter pins 14 in adjacent ends of the spindle. The end of one spindle 11 is connected with the adjacent end of the other spindle 11, by means of a transversely-extending link plate 13, as shown more particularly in Fig. 3. By this connection, it will be seen that the plates 6 and 7 form a substantially square construction in cross section, which arrangement of plates is held in position by means of the spindles 11 and link plates forming a retaining band carried by the outer end of the hub spring 3. The inner free ends of each of the plates 7 has an aperture extending therethrough, which aperture is adapted to be engaged by a stud 15 carried by each of the opposing clamp plates 16, which clamp plates extend beyond each side of the reduced end of the plate 7 and is angularly inset, through which inset portion are passed clamping bolts 17. It will be seen that the clamps 16 and bolts 17 prevent the two free ends of the rim springs 6 from spreading. If desired, guard plates 18 may be disposed on opposite faces of the hub 1, so as to support the wheel in case of the breaking of any of the springs.

Having thus described my invention, I claim as new and desire to secure by Letters Patent:

1. A resilient wheel, comprising a hub, a rim concentrically disposed relative to said hub and movable relatively thereto, a series of hub springs extending radially from said hub toward said rim, and a pair of spaced apart rim springs carried by said rim for each hub spring, said rim springs disposed on opposite sides of said hub springs and in frictional engagement therewith.

2. A resilient wheel, comprising a hub, a rim concentrically disposed relatively to said hub, telescopic spokes connecting said hub with said rim the members of said telescopic spokes consisting of spring plates, and means carried by said spokes adapted to permit a longitudinal movement of the telescoping parts of the same.

3. A resilient wheel comprising two members, one, a hub, and the other, a rim, concentrically disposed relative to said hub, and telescoping spoke connections between said hub and rim, said telescoping connections comprising a flat spring plate disposed transversely of the plane of the wheel, projecting from one of said members and slidably in engagement with a pair of parallelly-disposed flat spring plates projecting from the other of said members.

4. A resilient wheel, comprising a hub member and a rim member, a flat spring spoke connecting said members, said spoke comprising a set of flat springs projecting inwardly from said rim member, a co-acting spring projecting outwardly from said hub member, and clamping means maintaining said springs in position.

5. In combination, a hub, a rim, spokes connecting said hub with said rim and each comprising two spaced members free at one end and a third member adapted to move between the spaced members, plates disposed on opposite edges of the spaced members and with which the said third member has a sliding engagement, a clamp carried by said plates at the free ends of said spaced members and adapted to prevent the said free ends of the members from spreading, and guard plates disposed on opposite sides of said hub and extending at opposite sides of the spokes to maintain said spokes in alinement.

6. In a resilient wheel, a spoke comprising two parallelly-disposed spaced-apart flat spring plates, means connecting said plates together at one end, a third plate adapted to telescope between the first-mentioned plates, a pair of side plates disposed on opposite edges of said spring plates, and means maintaining said plates in position.

7. In a resilient wheel, a spoke comprising two parallelly-disposed spaced-apart flat spring plates, means connecting said plates together at one end, a third plate adapted to telescope between the first-mentioned plates, a pair of side plates disposed on opposite edges of said spring plates, and means carried by said telescoping plate adapted to maintain said plates slidably in position.

8. In a resilient wheel, a spoke comprising two parallelly-disposed spaced-apart flat spring plates, means connecting said plates together at one end, a third plate adapted to telescope between the first-mentioned plates, a pair of side plates disposed on opposite edges of said spring plates, clamping plates carried by said side plates, adapted to prevent the free ends of the spaced-apart plates from spreading, and additional clamping means carried by said telescoping plate.

9. A resilient wheel, comprising a hub, a rim, spokes connecting the hub and rim and each having spaced-apart members connected together at one end, and a member adapted to telescope between the spaced members, plates disposed on opposite edges of the spaced-apart members of each spoke and provided with longitudinal slots, the said telescoping member having extensions slidably engaging said slots, and means for maintaining said side plates in position.

10. A resilient wheel, comprising a hub, a rim, spokes connecting the hub and rim, each spoke having spaced-apart members connected together at one end, and a member adapted to telescope between the said spaced-apart members, and having apertured extensions, side plates disposed on opposite edges of the said spaced-apart members of each spoke and having longitudinal slots through which project the said apertured extensions of the telescoping member, spindles extending through the apertures of said extensions, rollers on said spindles, and means for connecting the corresponding ends of the spindles.

In testimony whereof I have signed my name to this specification in the presence of two subscribing witnesses.

SUMMERS BROWN.

Witnesses:
 FREDERICK WARREN,
 BERTRAM A. WEIR.